United States Patent [19]

Mahmud

[11] Patent Number: 5,024,766
[45] Date of Patent: Jun. 18, 1991

[54] POINT OF USE DEIONIZED WATER PURIFICATION UNIT

[76] Inventor: Shahzad Mahmud, 4050 Naomi Ct., San Jose, Calif. 95136

[21] Appl. No.: 269,219

[22] Filed: Nov. 9, 1988

[51] Int. Cl.$^5$ .............................................. C02F 9/00
[52] U.S. Cl. .................................... 210/668; 210/669; 210/686; 210/748; 210/805; 210/806; 210/142; 210/195.1; 210/196; 210/202; 210/258; 210/259; 210/266; 210/900
[58] Field of Search ............... 210/663, 668, 669, 748, 210/194, 196, 253, 258, 259, 266, 284, 900, 686, 805, 806, 142, 195.1, 202

[56] References Cited

U.S. PATENT DOCUMENTS 3,870,033  3/1975  Faylor et al. ....................... 210/900
4,383,920  5/1983  Muller et al. ....................... 210/241
4,548,716 10/1985  Boeve ................................. 210/900

OTHER PUBLICATIONS

Veloz, Thomas M., "Evaluation of In-Line Low Pressure 185 Nanometer UV Devices in Reducing TOC in High Purity Water", *Seventh Annual Semiconductor Pure Water Conference*, pp. 215-240, Jan. 14-15, 1988.
Meyers, Peter S., "Destruction of Organics in Pure Water Using UV Light", *Seventh Annual Semiconductor Pure Water Conference*, pp. 241-258, Jan. 14-15, 1988.
Tyldesley, J. D. et al., "The Use of Photo-Oxidation in Water Treatment", *Seventh Annual Semiconductor Pure Water Conference*, pp. 259-278, Jan. 14-15, 1988.
Hauser, E. W. et al., "Factors Related to TOC Measurement in High Purity Water Processess Used in the Semiconductor Industry", *Sixth Annual Semiconductor Pure Water Conference*, pp. 39-58, Jan. 15-16, 1987.
Emery, A. P. et al., "The Analysis and Identification of Ion Exchange Degradation Products in Ultra Pure Water", *Seventh Annual Semiconductor Pure Water Conference*, pp. 170-193, Jan. 14-15, 1988.
Hall, David et al., "A Study of Particulate Contamination in High Purity Water for Integrated Circuit Manufacture", *Third Annual Semiconductor Pure Water Conference*, pp. 105-126, Jan. 12-13, 1984.
Fergason, Lewis A., "Analysis of Organic Impurities on Silicon Wafer Surfaces", *Microcontamination*, pp. 33-37, 60, Apr. 1986.
Craven, R. A. et al., "High-Purity Water Technology for Silicon-Wafer Cleaning in VLSI Production", *Microcontamination*, Nov. 1986.
Dial, Forrest et al., "The Effect of High Bacteria Levels with Low TOC Levels on Bipolar Transistors: A Case Study", *Sixth Annual Semiconductor Pure Water Conference*, pp. 178-193b, Jan. 15-16, 1987.
Hanselka, R., "Deionized Water Storage and Transport Systems as Sources of Contamination", *Third Annual Semiconductor Pure Water Conference*, pp. 191-200, Jan. 12-13, 1984.
McConnelee, Paul A. et al., "The Role of Water Quality Improvements in VLSI Defect Density", pp. 1-10, date unknown.
Bowling, R. Allen, "An Analysis of Particle Adhesion on Semiconductor Surfaces", *J. Electrochemical Society: Solid-State Science and Technology*, pp. 2208-2214, Sep. 1985.

(List continued on next page.)

*Primary Examiner*—Ivars Cintins
*Attorney, Agent, or Firm*—Skjerven, Morrill, MacPherson, Franklin & Friel

[57] ABSTRACT

The deionized water purification of this invention is a small compact unit which is inserted between the purified deionized water distribution line in a plant water purification system and the inlet of a point of use apparatus. The small compact modular point of use deionized water purification unit reduces the total organic contaminant loading, the particulate loading, and the ionic contaminants in the purified deionized water from the plant purification system. The purification unit of this invention also includes means for sterilization of the point of use deionized water purification unit and a new technique for preventing damage to the ozone generator used in the sterilization process.

21 Claims, 10 Drawing Sheets

SIDE

ENCLOSURE FRONT

BACK PANEL

POINT OF USE DEIONIZED WATER PURIFICATION UNIT

BACKGROUND OF THE INVENTION

1. Field of the Invention

The present invention relates generally to the production of high purity deionized water and more specifically to the enhancement of deionized high purity water at the point of use.

2. Description of the Prior Art

The requirement for high purity water has evolved in several industries. The water purity requirements of the semiconductor industry are among the most demanding of any industry. While the yield of semiconductor chips is dependent upon a variety of factors, the average chip yield is directly related to the purity of deionized process water. As the size of the geometry used on the chips decreases, the adverse effects on yield of impurities in the deionized (DI) process water increase. Accordingly, the requirement for high purity water in semiconductor processing is widely recognized.

Although there is not a widely accepted standard for electronic grade process water, some of the proposed American Society for Testing and Materials (ASTM) requirements for electronic grade water type E-1 (point-of-use ultrapure water) are given in Table 1.

TABLE 1

| Description | Quantity |
| --- | --- |
| Resistivity (minimum, megaohms-centimeters) | 18 (90% of time) with 17 minimum. |
| $SiO_2$ (total, maximum, micrograms per liter) | 5 |
| Particle count (particles larger than 1 micron, maximum per milliliter) | 2 |
| Microorganisms (per milliliter) | 1 |
| Total organic carbon (TOC) (maximum micrograms per liter) | 50 |

However, despite the recognition of the requirement for high purity water in semiconductor processing, providing high purity water at the point of use is still problematic, as described more completely below. "Point of use," as used herein, means the point at which a water supply line and a water inlet of an apparatus, such as sinks and spin rinser dryers used in semiconductor processing, are connected.

A typical high purity water system 50 is illustrated in FIG. 1. A source of water 10, usually from a city water supply or a water well source, is passed first through a first granular activated carbon bed 11 and then a filtering system 12. Granulated activated carbon bed 11 and filter 12 remove contaminants which would damage reverse osmosis system 13 to which the water flows from filter 12. After the water is treated by reverse osmosis, the water is passed through deionizing beds 14 and then through an ozone contactor 15 into a holding tank 16. Typically, holding tank 16 has at least a capacity of several hundred liters and more likely a capacity of thousands of liters.

Water is pumped from holding tank 16 by a pump 17 and passed through a first deozonation unit 18 and then into a DI water polisher 19. Subsequently, water from polisher 19 is passed through a submicron filter system 20 and water from filter system 20 is provided to one or more points of use $90_1, 90_2, \ldots, 90_N$. Typically, points of use $90_1, 90_2, \ldots, 90_N$ are a series of outlets on a rack 90 in a semiconductor fabrication processing unit 21.

Water not extracted from the high purity water system at points of use $90_1, 90_2, \ldots, 90_N$ flows through rack 90 into ozone contactor 15. Thus, a closed loop through ozone contactor 15, holding tank 16, pump 17, deozonation unit 18, polisher 19 and DI water submicron filter unit 20 is formed for the high purity DI water.

To remove bacterial and other living components from high purity water system 50, i.e., sterilize the high purity water system, the water is circulated through the closed loop bypassing deozonation unit 18 and polisher 19. Ozone from ozone generator 27 is introduced into the water through ozone contactor 15. The ozone kills living organisms in the water as well as living organisms attached to the walls of the water system. Within a short period after sterilization, living organisms are again found in the water system.

Typically, as shown in FIG. 1, after the high purity deionized water is used at a point of use, the rinse water is collected and pumped by a pump 22 through a second granular activated carbon bed 23. The water from carbon bed 23 is passed through filter 24 and subsequently through an ozone, UV, $H_2$ and $O_2$ reactor 25. Water from reactor 25 is passed through a second deozonation unit 26 before being returned for processing by reverse osmosis unit 13.

While system 50, as in FIG. 1, provides water at the point of use having a higher quality than the quality of the original source of water 10, high purity water system 50 is not only a source of contaminants, but also system 50 provides an environment in which bacteria and other organisms flourish. The level of contamination introduced by the system is affected by regions of low flow within system 50.

Thus, the quality of water available at a point of use from a typical high purity water system is limited by the design and operation of the system. Further, as the components in the system age, the water quality at the point of use is likely to degrade. Upgrading the water quality to the level given in Table 1 requires upgrading the entire distribution system illustrated in FIG. 1. Such an upgrade is difficult, expensive and time consuming.

Several different techniques have been investigated for improving the water quality of existing water purification systems, such as system 50 illustrated in FIG. 1. These techniques include alternative methods for sterilizing the loop to kill bacteria, using ultraviolet light to lower the organic carbon contaminants, i.e., reduce the TOC level, and placing submicron filters at the point of use. However, the effectiveness of these techniques is limited by the size, configuration and operation of the high purity DI water system.

For example, to completely sterilize system 50 (FIG. 1) requires halting water usage throughout fabrication site 21 and continuing the sterilization process until holding tank 16, all piping, and other components in the system are sterilized. However, even when this is done, the living organisms, as previously described, return to the original level within a short period of time. Therefore, the production capacity of fabrication site 21 could, in some instances, be limited by the DI process water quality and consequently the time required for sterilization of the complete system.

The high purity process water systems currently available are all directed to providing a uniform quality of water at multiple points of use. Accordingly, these systems do not provide a means for compensating for different requirements in water quality at different points of use, or for providing ultra pure water at selected points of use.

SUMMARY OF THE INVENTION

The point of use of deionized water purification unit of this invention, unlike prior art purification systems that generate deionized water from city or well water, provides a means for further purification of water from a prior art plant water purification system. The DI water purification unit of this invention is a small compact unit which is inserted between the water line from the purified deionized water rack in the plant water purification system and the inlet of the point of use apparatus.

In a first embodiment, the point of use DI water purification unit of this invention lowers the total organic contaminant (TOC) level of purified water from a plant purification system using an organic contaminant removal unit. The water from the organic contaminant removal unit is subsequently filtered and the filtered water provided to the point of use apparatus. In one embodiment, the organic contaminant removal unit is an ultraviolet lamp unit which generates 185 nanometer wavelength radiation that is absorbed by organic contaminants in the water which in turn decompose into additional ionic contaminants.

In an alternative embodiment, the organic contaminant removal unit which lowers the TOC level is replaced by a polisher that removes ionic contaminants in the water from the plant water system. The polished water is filtered and supplied to the point of use apparatus. A centrifugal pump may be used upstream of the filter in either of these embodiments to provide a constant pressure to the point of use apparatus irrespective of fluctuations in the pressure of the plant purification system supply line.

In yet another embodiment of this invention, purified water from the plant purification system is dropped in pressure and provided to the suction line of a pump which in turn provides water at an approximately constant pressure to an organic contaminant removal unit and subsequently to a filter unit. Water from the filter unit passes through a line in the point of use apparatus and is returned to a polishing unit in the point of use deionized water purification unit. Water from the polishing unit passes through a sterilization unit and then is returned to the suction line of the pump.

In this embodiment, water in the point of use deionized water purification unit is recirculated through a closed distribution loop consisting of the pump, organic contaminant unit, filter unit, point of use apparatus, polishing unit, and sterilization unit. On each pass of water through the distribution loop the particulates and organic contaminants are further reduced by the filter and the organic contaminant removal unit. As water is withdrawn from the distribution loop by the point of use apparatus, additional makeup water is supplied by the plant purification system.

In one embodiment, the polishing unit is two parallel mix bed polishers having synthetic resins which are 70% anion resins and 30% cation resins. The 70/30 mixture of resins provides a good approximation of the ratio of the cation to anion contaminants in the point of use water purification system of this invention.

The sterilization unit is comprised of a novel ozone generator, a venturi, and a pressure regulating valve which is connected in parallel with the venturi. The pressure regulating valve drops the purification unit water pressure so that the water pressure in the ozone venturi is such that ozone is drawn into the water and thoroughly mixed with the water.

If water vapor passes from the venturi into the ozone generator, the ozone generator would be damaged. Therefore, a solonoid operated valve is inserted between the ozone venturi and the outlet of the ozone generator. This valve is normally closed so as to prevent water from migrating into the ozone generator. Additionally, a vent line is coupled to the line running from the outlet of the ozone generator to the solenoid operated valve so that oxygen may be continuously vented through the generator.

To sterilize the point of use purification unit, the mix bed polishers are bypassed and the organic contaminant removal unit is partially bypassed. The ozone generator is activated and the solonoid valve in the ozone generator output line opened so that ozonated water is formed in the distribution loop. The ozone kills bacteria on the wetted surfaces of the distribution loop, the points of use, and in the water. The frequency and duration of the sterilization is determined and automatically performed by a control unit so that the bacteria level is maintained at an acceptable level at all times.

The point of use deionized water purification unit of this invention provides a new and enhanced flexibility in providing high purity water at the point of use without requiring major changes or retrofitting to the plant purification system.

DETAILED DESCRIPTION

Figure 1:
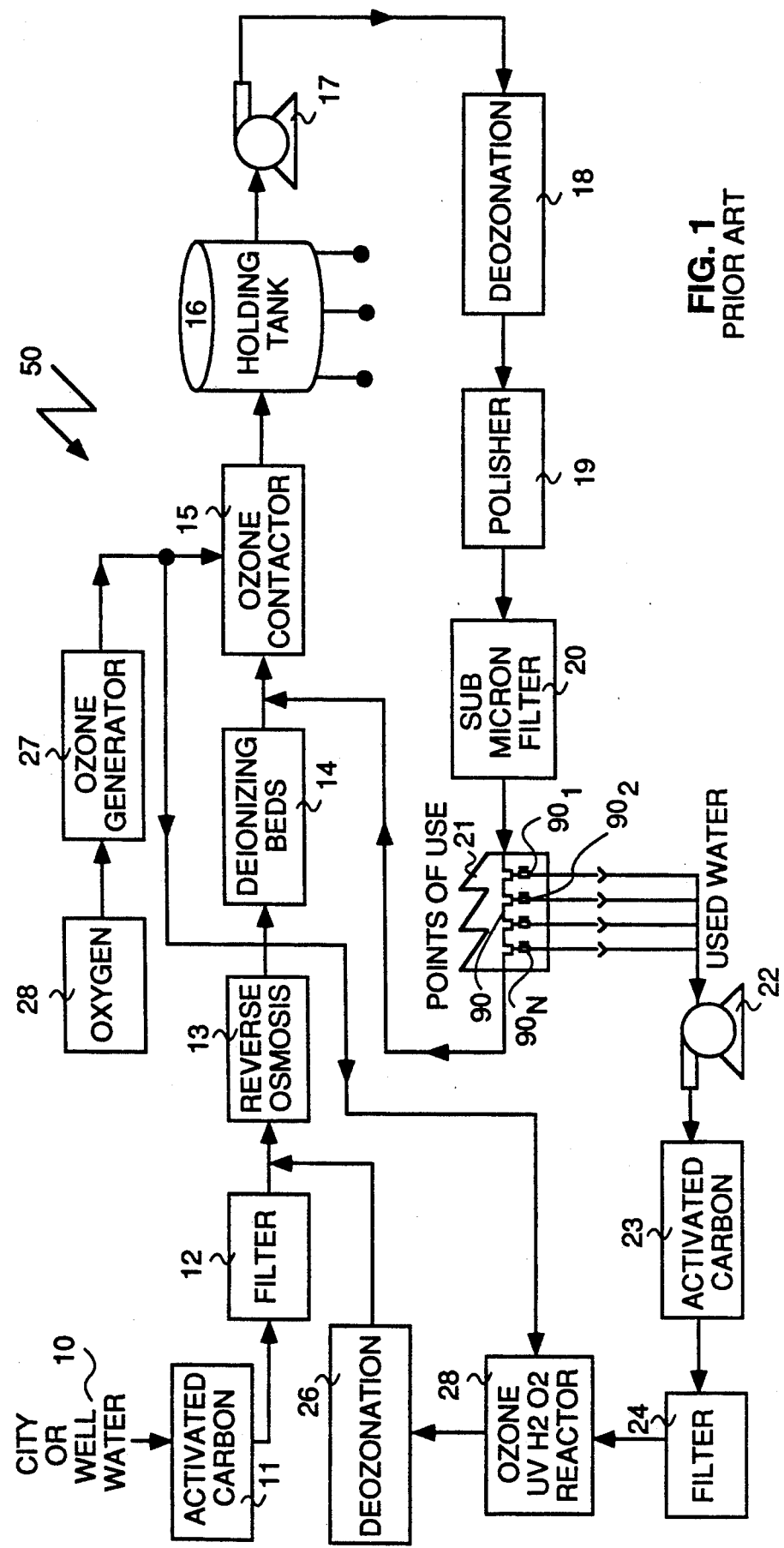
FIG. 1 illustrates a prior art deionized water purification system.
Figure 2:
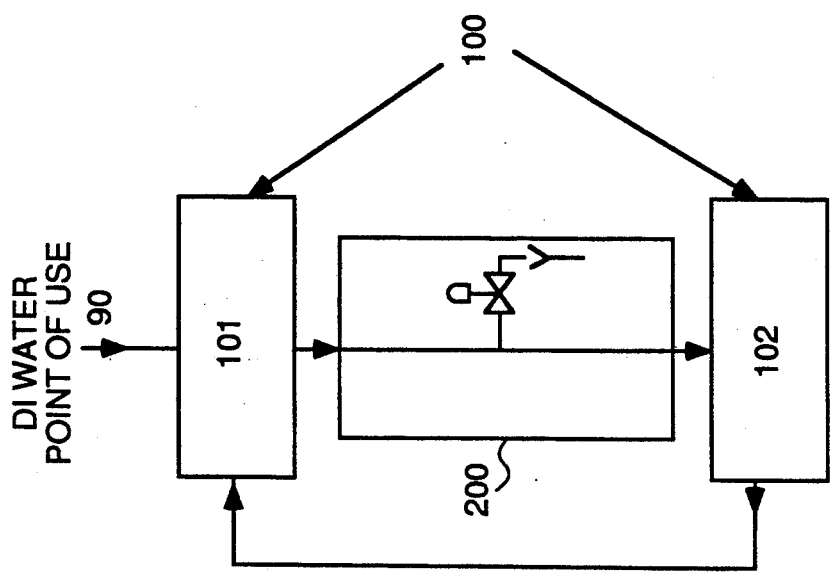
FIG. 2 is a general block diagram of the point of use deionized water purification unit of this invention.

The point of use deionized water purification unit 100 of this invention, shown as a block diagram in FIG. 2, has two units 101, 102. The water supply 90 to purification unit 100 is a purified water distribution line in fabrication unit 21 (FIG. 1). Therefore, unlike the prior art systems that generate deionized water from city or well water, purification unit 100 of this invention starts with the purified deionized water of prior art system 50 (FIG. 1) and provides a means for further purification.

The purified water from distribution water supply line 90 flows into a first unit 101 (FIG. 2) of purification unit 100. Unit 101 treats the water with ultraviolet light to reduce the TOC level and then filters the water. Unit 101, in one embodiment, supplies the treated water to an apparatus 200, which requires high purity deionized process water, at a constant flow and pressure irrespective of fluctuations in the pressure and flow of water from water supply line 90. Thus, according to the principles of this invention, the high purity water from unit 101 of purification unit 100 is supplied directly to apparatus 200, typically an apparatus such as a sink used in semiconductor fabrication. Consequently, when unit 100 is located physically adjacent to apparatus 200, sources of contamination and regions for growth of contamination between purification unit 100 and point of use 200 are at a minimum in comparison to the prior art systems.

In this embodiment, after the high purity water passes through apparatus 200 (FIG. 2), the water is passed through a second unit 102 (FIG. 2) of purification unit 100 and then cycled back into unit 101 of water purification unit 100. Unit 102 polishes the water, i.e., removes ionic contaminates, and then provides the water to unit 101. Unit 101 drops the pressure of the polished water and passes the water through a sterilization unit, as described more completely below. The water is then recycled through the ultraviolet light and filter and again supplied to apparatus 200. The recirculation of water through unit 101, apparatus 200, and unit 102 permits a higher purification of the water than is possible with a single pass system. Water from distribution line 90 is essentially used only as a makeup source for water used by apparatus 200.

Typically, water supplied by the plant DI water system, such as system 50 illustrated in FIG. 1, has a flow rate ranging from 15 to 20 gpm at a pressure of 20 to 40 psig. The typical quality of the DI water in distribution line 90 (FIG. 2) is:

Bacteria: 0–30 colonies per 100 ml
TOC: 30–70 ppb (parts per billion)
Resistivity: 17–18 megaohms-cm
Silica: <5 ppb After processing by purification unit 100, the water quality provided to apparatus 200 is:

Bacteria: 0 colonies per 100 ml
TOC: 15–35 ppb
Resistivity: 17–18 megaohms-cm
Silica: <3 ppb Thus, the small, compact modular point of use deionized water purification unit 100 of this invention significantly enhances the water purity. Moreover, unit 100 is easily attached between the distribution line of the plant water purification system (FIG. 1) and the point of use and does not require any major replumbing or reconfiguration of apparatus 200 to which it is attached.

Water purification unit 100 provides a flexibility that is not attainable with prior art systems. For example, the quality of water required from plant system 50 (FIG. 1) is no longer determined by the point of use apparatus requiring the highest water quality. If the quality of water from the plant system is acceptable for the majority of points of use, attachment of unit 100 (FIG. 2) to any point of use requiring a higher quality of water provides the necessary water quality at that point. Therefore, modifications or repiping of the plant system are no longer required when the water quality generated by the plant system falls below the highest quality required at a point of use.

Figure 3:
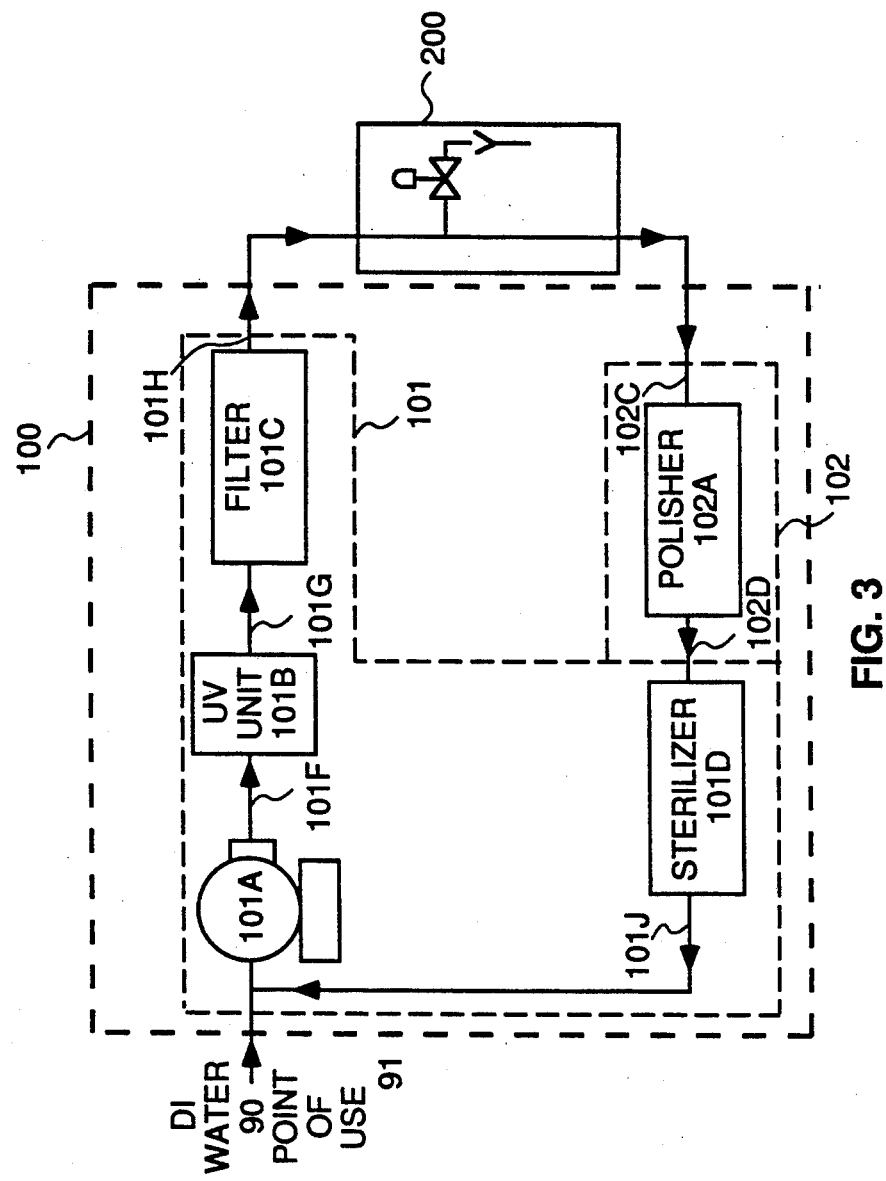
FIG. 3 is a detailed block diagram of the point of use deionized water purification unit of this invention.

A more detailed block diagram of one embodiment of the modular point of use DI water purification unit 100 of this invention is shown in FIG. 3. The DI distribution pipe 90 supplies water through a pipe 91 to unit 101 which includes a pump 101A, an organic contaminant removal unit 101B and a filter unit 101C. Pump 101A provides a constant flow through unit 101 irrespective of pressure fluctuations in DI water line 91 from distribution pipe 90. Water from pump 101 flows through organic contaminant removal unit 101B which contains ultraviolet (UV) lamps having a wavelength such that organic contaminants in the water absorb the ultraviolet radiation and subsequently decompose into substances readily removed from the water by other components in unit 100.

After the water passes through unit 101B, the water passes into filter unit 101C where particles having a size greater than 0.2 microns are effectively removed. Thus, the water from filter 101C in line 101F has reduced particulates and TOC loadings so that the water going into fabrication apparatus 200 has a higher quality than the quality available from distribution line 90.

In fabrication apparatus 200, some of the water may be used, but the remaining water cycles through apparatus 200 and passes into unit 102. Unit 102 has a polisher 102a. The polisher, in a preferred embodiment, is a mixed bed polisher which removes ionic impurities from the water supplied by line 90 as well as any ionic impurities that may result from reaction of organic contaminants with the ultraviolet light from UV unit 101B.

Water from polisher 102A is passed through sterilizer 101D in unit 101 and subsequently to the inlet of pump 101A. Sterilizer 101D is not used continuously, but rather sterilizer 101D is used every fifteen minutes to four hours, as needed, to adequately control bacterial contamination. The operation of the sterilization process is controlled at a control panel (FIGS. 5A–5I) which is described more completely below.

As described previously, the flow through the unit 100 is a closed recirculation path, sometimes called a distribution loop, with the flow being from unit 101 through the apparatus 200, unit 102, and back into unit 101. This recirculation flow provides a means for further enhancing the quality of the water provided to unit 200, as described more completely below. With each pass through UV unit 101B, filter unit 101C and polisher 102A, the contaminants in the water are further reduced. The DI water from distribution line 90 is only used as makeup water for the quantity of water removed from the distribution loop by use of apparatus 200.

The arrangement of pump 101A, UV unit 101B, filter unit 101C, polisher 102A, and sterilization unit 101D (FIG. 2) is illustrative of only one embodiment of this invention and is not intended to limit the scope of the invention. In another embodiment (not shown), polisher 102A is included within unit 101 so that the water passes through the polisher before reaching apparatus 200.

Figure 4:
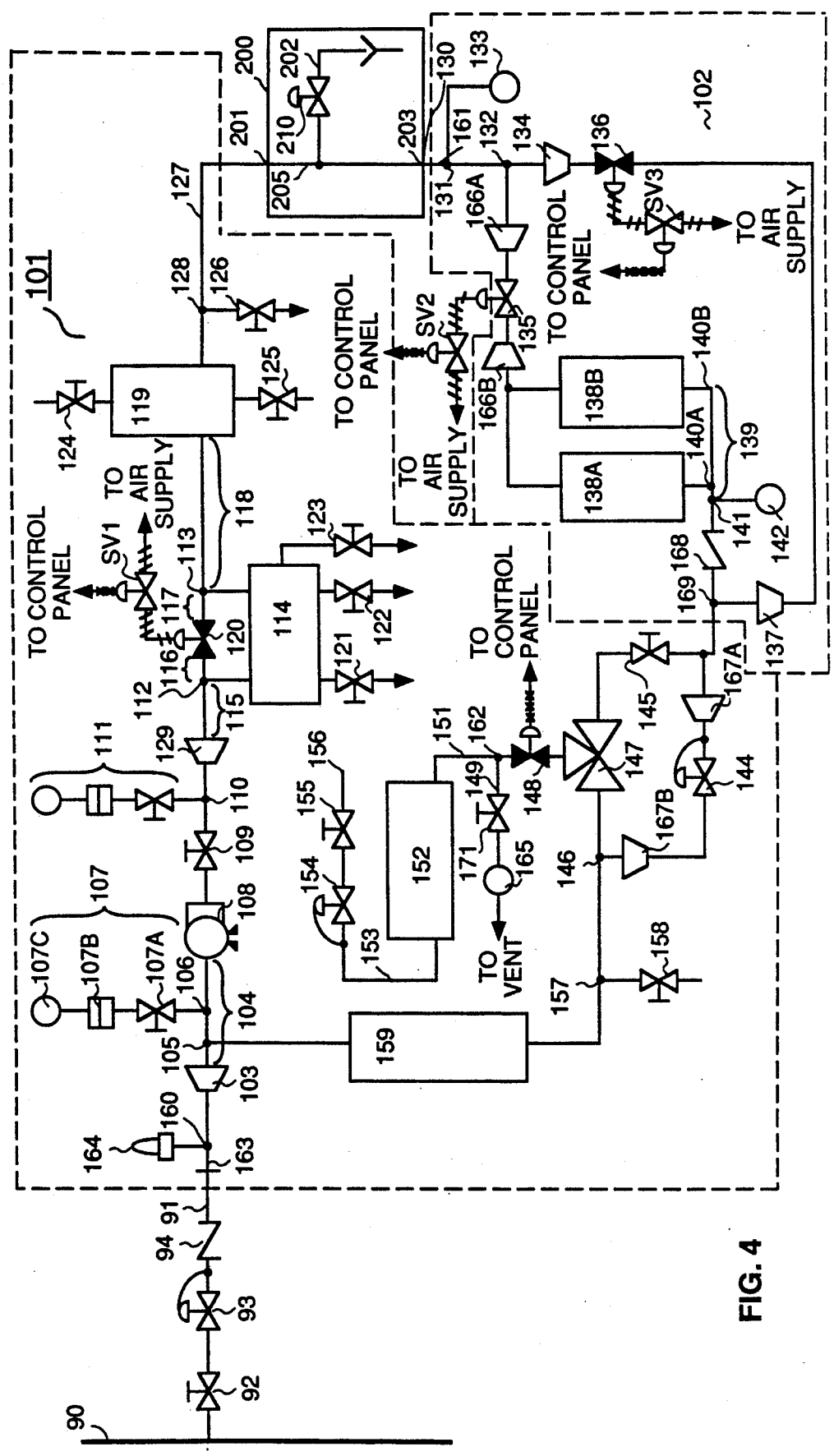
FIG. 4 is a detailed schematic diagram of the point of use deionized water purification unit of this invention.

A detailed schematic diagram of a point of use deionized water purification unit 100, according to the principles of this invention, is illustrated in FIG. 4. Unit 101 of FIGS. 2 and 3 is represented by the dotted line which encloses pump 108, UV lamp unit 114, filter unit 119, ozone contactor 147, ozone generator 152, and flow meter 159. Unit 102 of FIGS. 2 and 3 is shown in FIG. 4 by the dotted line enclosing parallel polishers 138A, 138B.

Units 101 and 102 represent skids (not shown) upon which the equipment in units 101, 102 is physically mounted. The equipment contained in units 101, 102 is illustrative of one embodiment of the invention and is not intended to limit the scope of the invention. In view of the following description, other configurations of the equipment in point of use DI water purification unit 100 will be apparent to those skilled in the art.

In the prior art, distribution line 90 was coupled directly to inlet 201 of apparatus 200 which used the DI process water. However, in the present invention, point of use DI water purification unit 100 is interconnected between distribution line 90 and inlet 201 of apparatus 200.

As shown in FIG. 4, distribution line 90 of the plant purification system (FIG. 1) is coupled by a manually operated valve 92, a pressure regulating valve 93, and a check valve 94, all of which are connected in series, to line 91. If valves 92, 93, 94 are not available in the plant distribution system, valves 92, 93, 94 can be included within purification unit 100 of this invention.

Valve 92 functions as an isolation valve and is normally in the open position. Pressure regulating valve 93 is adjusted so that the water pressure from distribution lines 90 is compatible with the pressure required at the suction of pump 108, as described more completely below. Check valve 94 prevents pumping of water from purification unit 100 back into line 90 whenever the water pressure in line 90 falls below the suction pressure of pump 108.

Figure 5A:
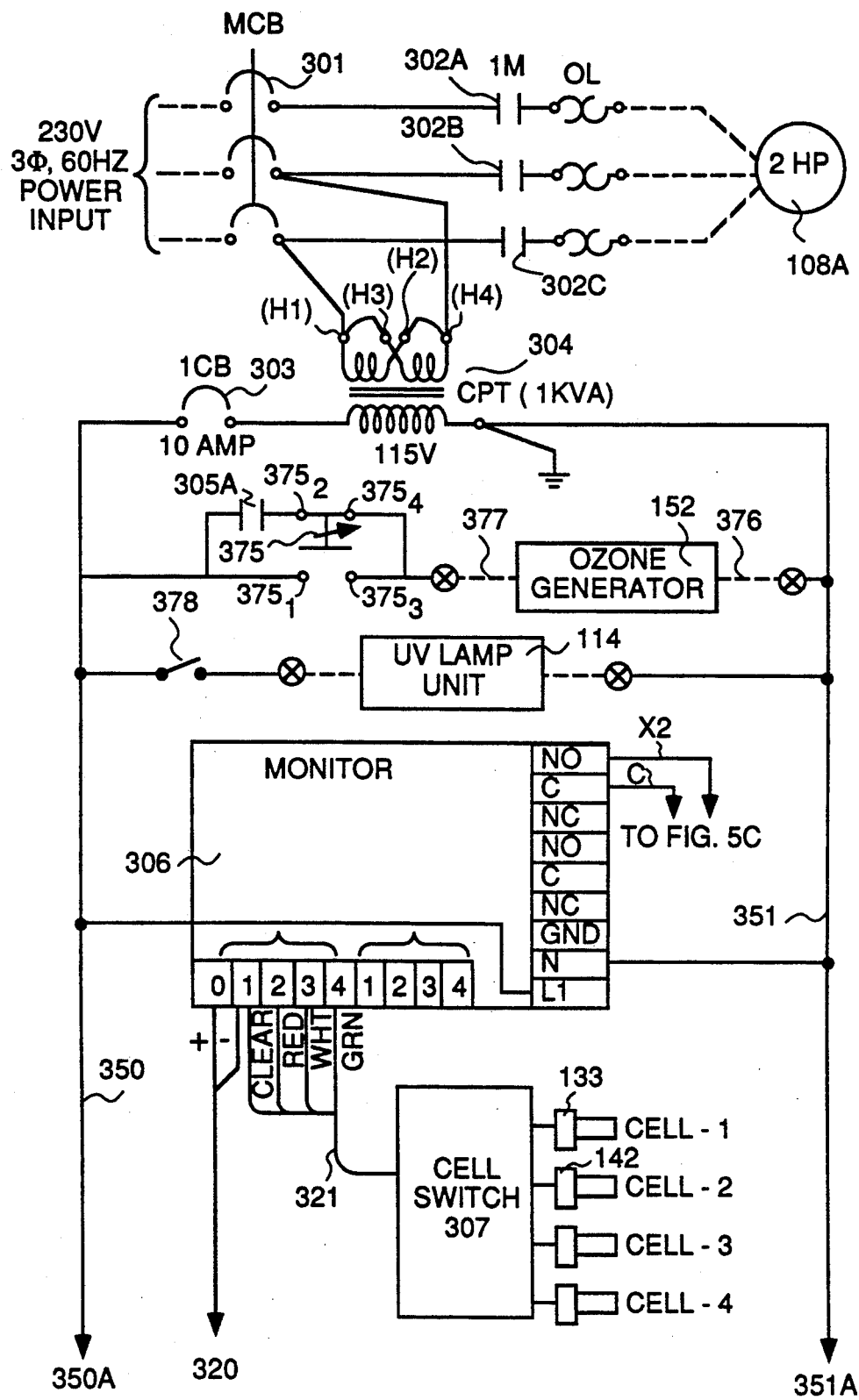
FIGS. 5A-5I illustrate one embodiment of the control panel of this invention.
Figure 5B:
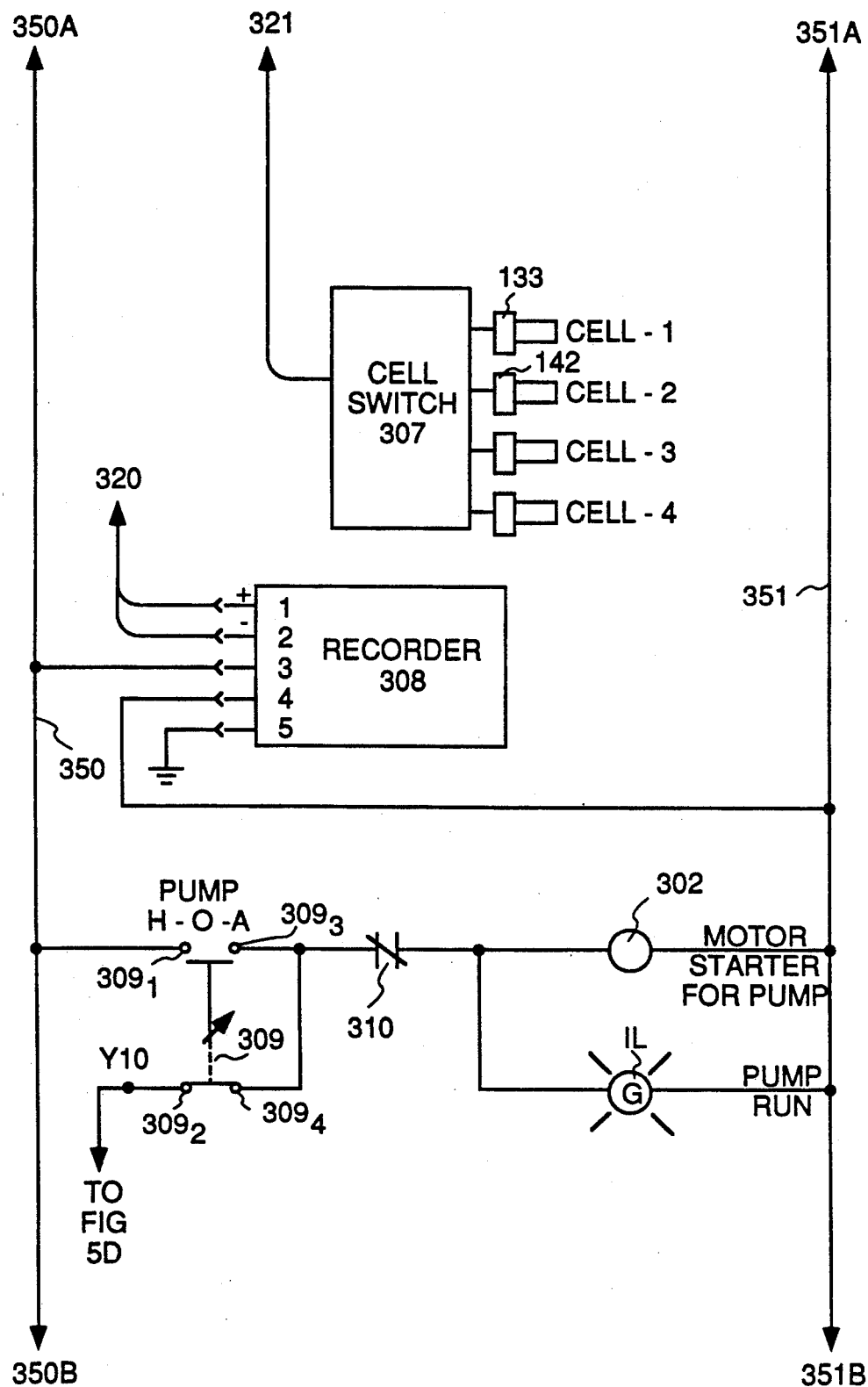
Figure 5C:
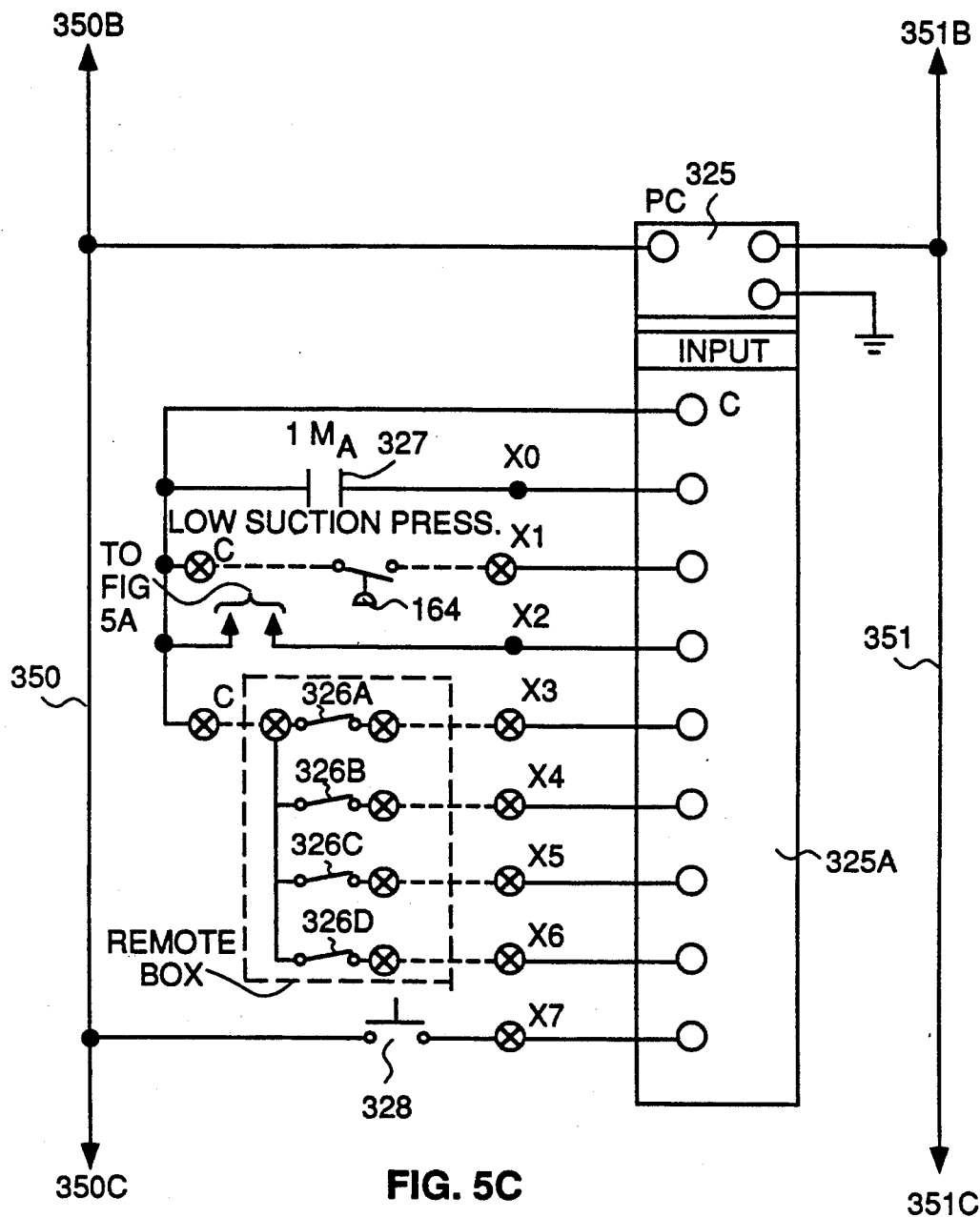

Line 91 is connected to inlet pipe 163, a 1½ inch inside diameter (ID) poly vinylidene fluoride (PVDF) pipe. A first tee 160 has a first leg with a 1½ inch ID connected to pipe 163; a second leg with a 1½ inch ID connected to a coupler 103; and a third leg with a ½ inch ID. The various PVDF piping components are interconnected using socket fusion, a technique known to one skilled in the art. A pump low pressure cutout sensor 164 is attached to the ½ inch line from tee 160. Pump low pressure cutout sensor 164 is electrically connected (not shown) to main control panel 150 (FIG. 5C).

Pressure cutout sensor 164 (FIG. 4) generates a low pressure signal to main control panel 150 (FIG. 5C) whenever the water pressure in line 102 falls below 1" Hg. The low pressure signal from sensor 164 is used to turn off pump 108 so as to prevent cavitation when pump 108 is operating in the automatic mode, as described more completely below.

Coupler 103, which is connected to the second leg of tee 160 smoothly increases the pipe ID from 1½ inches to 2 inches. Coupler 103, and each of the couplers described below, may be incorporated in one of the tees connected to the coupler. Transistions from one pipe size to another are smooth, rather than abrupt, so that stagnant flow areas are minimized in purification unit 100. Suction pipe 104, which is 2 inch ID PVDF piping, connects coupler 103 to pump 108. Two tees 105, 106 are inserted in suction pipe 104. Tee 105 connects flow meter 159 into suction line 104. Tee 106 has two 2 inch ID legs connected in suction line 104 and a third ½ ID leg connected to a first pressure sensor 107.

Pressure sensor 107 includes a manually operated valve 107A, a pressure sensing diaphragm 107B, and a pressure gauge 107C connected in series. Valve 107A is used to isolate pressure sensor 107 from suction line 104 and is normally in the full open position. Diaphragm 107B converts the water pressure in pipe 104 into a displacement that is sensed by pressure gauge 107C and visually displayed.

Pump 108 (FIG. 4) is electrically coupled to main control panel 150 (FIGS. 5A, 5B, 5C) and has a 2 inch suction inlet connected to suction line 104 (FIG. 4) and a 1½ inch outlet connected to manually operated valve 109. Pump 108 is a centrifugal booster pump constructed of PVDF. The pump has a total head of 82 gpm and is capable of producing flows from 40 to 85 gpm at pressures of 17 to 32 psig. Valve 109, in the discharge line of pump 108, is a manually operated throttle valve that is used to adjust the flow through the purification unit 100 as described more completely below.

Figure 6:
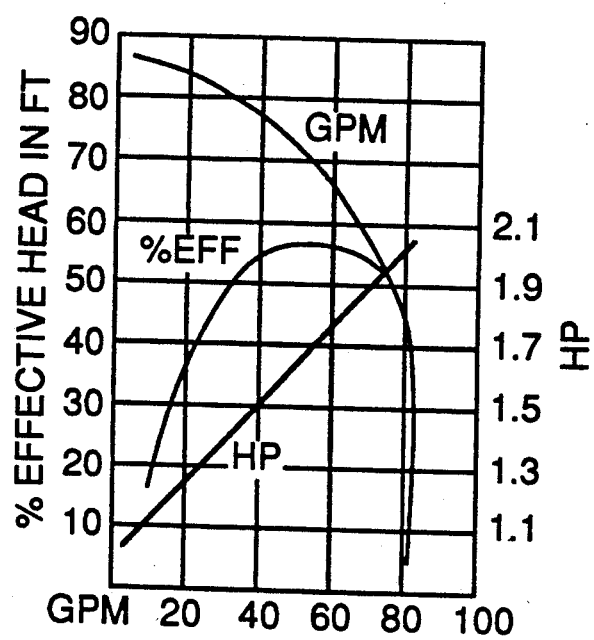
FIG. 6 illustrates a pump curve for a pump used in one embodiment of this invention.

One pump suitable for use in purification unit 100 is produced by Ryan Herco, of San Jose, Calif., and sold as Mag Drive Pump 6306-715 PVDF PUMP, 3-PH TEFC Motor. The pump curve for this pump is illustrated in FIG. 6. This two horsepower pump requires 3 phase 230 volts, 60 hertz and 5.2 amps.

Valve 109 (FIG. 4) is connected to a first leg with a 1½ inch ID of tee 110. A second leg, also with a 1½ inch ID, of tee 110 is connected to coupler 129. A second pressure gauge 111, which is similar to gauge 107 described previously, is connected to a third leg, having a ½ inch ID, from tee 110. Coupler 129 smoothly increases the 1½ inch inner diameter discharge line from pump 108 to a 2 inch ID.

A 2 inch ID line 115 connects coupler 129 to a first leg of tee 112. A second leg of tee 112 is connected by 2 inch line 116 to air operated valve 120. Air operated valve 120 is normally closed. A third leg of tee 112 is connected to a 2 inch ID inlet of ultraviolet (UV) lamp unit 114. Air operated valve 120 is connected to an air supply by a solenoid valve SV1. Solenoid valve SV1 is controlled from control panel 150 (FIG. 5D) so that air is selectively applied to valve 120. Valve 120 is opened and water flows through the valve during the sterilization cycle of unit 100, as described below. In another embodiment (not shown), valve 120 and solenoid valve SV1 are not used so that water flows directly through UV unit 114 at all times. In this embodiment, UV unit 114 is turned off during sterilization so that the partial bypass provided by valve 120 is no longer needed.

Air operated valve 120 is connected by line 117 to a first leg of tee 113. The second leg of tee 113 is connected by a 2 inch ID line 118 to an inlet of filter unit 119. A third leg of tee 113 is connected to a 2 inch ID outlet of UV lamp unit 114. Since valve 120 is closed in normal operation of unit 100, the water flows from pipe 115 through tee 112 to UV unit 114 and though UV unit 114 to filter unit 119.

Ultraviolet lamp unit 114, which is downstream from pump 108, has a ½ inch ID drain line with a manually operated valve 123. UV lamp unit 114 also has two ¼ inch sample lines, with each sample line containing a manually operated sample valve 121, 122. UV lamp unit 114 contains eight lamps which generate approximately 185 nanometer wavelength radiation. UV lamp unit 114 is electrically connected to main control panel 150, (FIG. 5A) as described more completely below, and is suitable for flow rates ranging from 40 to 100 gpm. A ultraviolet unit having the characteristics described is manufactured by Aquafine of Valencia, Calif., and sold as UV Sterilizer Model CSL8R. This sterilizer has a capacity of 100 GPM (22.73 m$^3$/hr) and requires 4.3 amps at 120 VAC to drive 516 watts. This unit generates a UV dosage of greater than 30,000 $\mu$W seconds/cm$^2$.

Filter unit 119, which is downstream of pump 108 and UV unit 114, has a vent valve 124 on a ½ inch ID line and a manually operated drain valve 125 on another ½ inch ID line. The outlet line 127 from filter unit 119 is connected through a tee 128 to inlet 201 of apparatus 200. Tee 128 has a ¼ ID inch leg which is attached to manually operated sample valve 126 which is normally in the closed position.

Filter unit 119 is resistant to ozone and suitable for installation in PVDF lines. As previously described, filter unit 119 removes particles larger than 0.2 microns.

A filter suitable for use in the invention is made by PALL of New York, and marketed under the trademark Fluorodyne™ filter cartridges. The operating characteristics of these cartridges are:

- Absolute rating: 0.15 μm
- Filter area per 10" module: 7.5 sq. ft.
- Maximum differential pressure
  - to 50° C.: 80 psi
  - to 90° C.: 50 psi
- Clean pressure drop: 2.3 gpm/psi
- $K^*_L$, water wet: 60 psi

*$K_L$ is the pressure at which liquid is expelled from the largest pores in a filter membrane.

- Titre reduction**: $>10^{13}$

**Titre reduction is the ratio of the number of influent to effluent bacteria.

The filter medium consists of two layers of hydrophilic PVDF membrane pleated between two layers, one polyester and the other polypropylene, formed to a cylinder and heat sealed at the seam. The pleated cylinder is assembled around a polypropylene internal support core then enclosed in an outer polypropylene protective cage.

Apparatus 200, as previously described may be a sink in a semiconductor fabrication unit or a spin rinse dryer for example. Moreover, multiple units may be connected to line 205. Therefore, the arrangement of unit 200 (FIG. 4) is illustrative only and should not be interpreted as limiting the application of purification unit 100 of this invention. Unit 200 has a line 205 connecting inlet 201 of unit 200 to outlet 203 of unit 200 and a line 202 containing an automatically operated valve 210 connected to line 205. When valve 210 is open, water is drawn into the sink and subsequently drained and the remaining water in line 205 flows through apparatus 200 to inlet 130 of unit 102. When valve 210 is closed, all the water circulates through line 205 of apparatus 200 to inlet 130 of unit 102 of this invention.

Inlet 130 is connected by pipe 161 to a first 2 inch ID leg of tee 131. A second 2 inch ID leg of tee 131 is connected to a first 2 inch ID leg of tee 132. A ¾ inch ID leg from tee 131 is connected to a resistivity probe 133 which is electrically connected to main control panel 150 (FIGS. 5A, 5B). The second 2 inch ID leg of tee 132, (FIG. 4) is connected to coupler 166A and the third 2 inch ID leg of tee 132 is connected to coupler 134. Couplers 134, 166A reduce the 2 inch ID line to a 1½ inch ID line. Coupler 134 is connected to air operated valve 136 and coupler 166A is connected to air operated valve 135. Air operated valves 136, 135 are also connected to couplers 137, 166B respectively, which increase the 1½ inch ID line to a 2 inch ID line.

Normally closed air operated valve 136 is coupled to an air supply line through solenoid valve SV3 while normally open air operated valve 135 is coupled to an air supply line through solenoid valve SV2. Solenoid valves SV3, SV2 are electronically coupled to control panel 150 (FIG. 5C) and selectively energized so that air is selectively applied to air operated valves 136, 135 respectively.

Coupler 166B is also connected to the inlets of mixed bed polishers 138A, 138B. The inlets of polishers 138A, 138B are connected in parallel. The outlets of polishers 138A, 138B are connected in parallel to a line 139 by tee 140A and elbow 140B respectively.

Line 139 is coupled to a first leg, with a 2 inch ID, of a tee 141. A second leg, with a ¾ inch ID, of tee 141 is connected to resistivity probe 142, which in turn is electrically connected to main control panel 150 (FIGS. 5A, 5B). A third leg, with a 2 inch ID, of tee 141 is connected to an inlet of check valve 168. The outlet of check valve 168 is connected to a first 2 inch ID leg of tee 169. A second 2 inch ID leg of tee 169 is connected to coupler 137. As previously described, coupler 137 may be replaced with a tee 169 having a second leg with a 1½ inch ID. A third 2 inch ID leg of tee 169 is connected to a first leg, having a 2 inch ID, of tee 143 in unit 101.

Figure 5D:
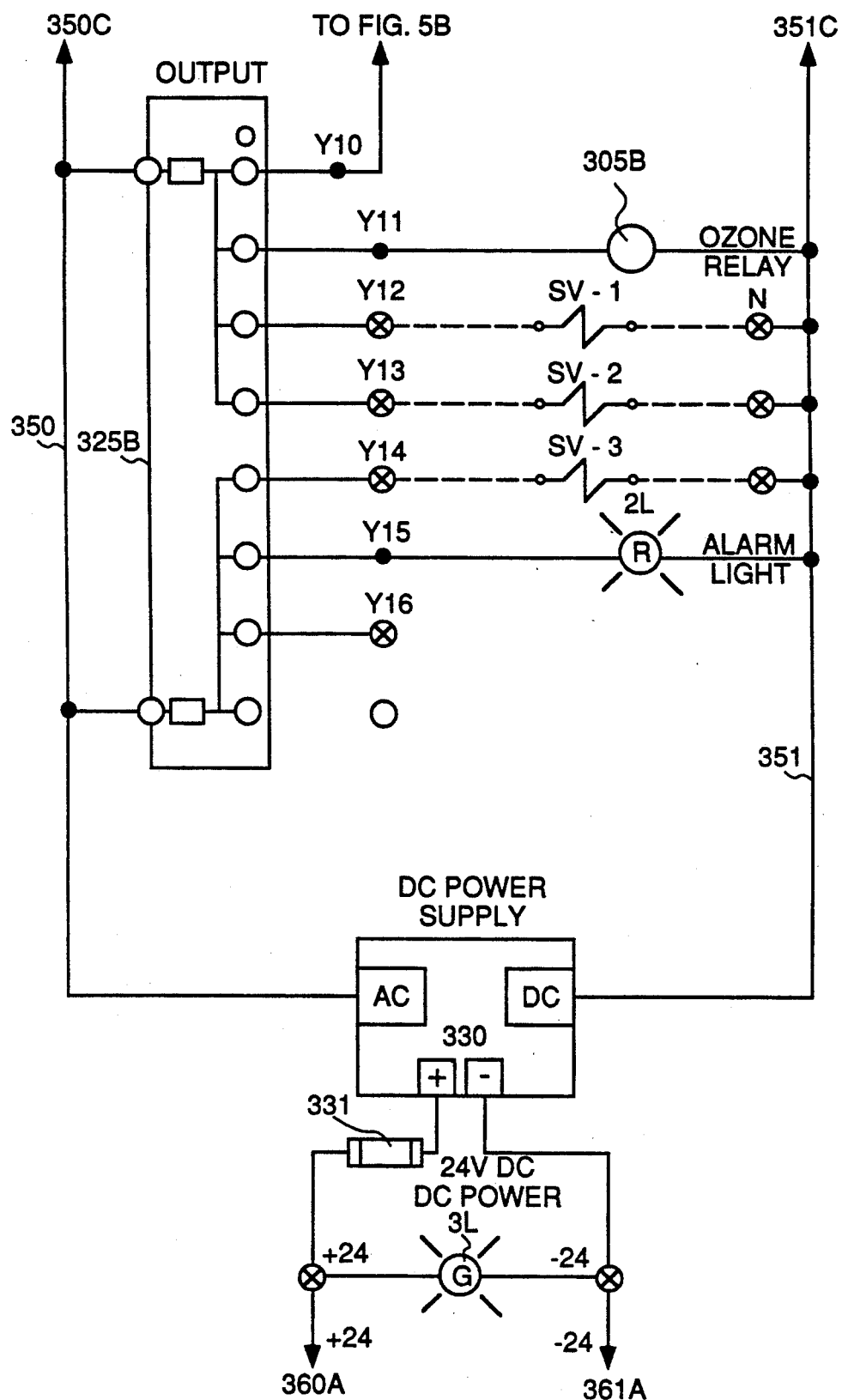

The second leg of tee 143 has a 1 inch ID and is connected to manually operated valve 145. Valve 145 is also connected to the water inlet of ozone verturi 147. The third leg of tee 143 is a 2 inch ID line which is connected to coupler 167A which reduces the line to a 1¼ inch ID. Coupler 167A is connected to pressure regulating valve 144. Pressure regulating valve 144 is connected to coupler 167B which increases the pipe ID to 2 inches. Coupler 167B is also connected to a first leg, with a 2 inch ID, of tee 146. A second leg, with a 1 inch ID, of tee 146 is connected to the water outlet of ozone venturi 147. Ozone generator 152 is connected to the ozone inlet of ozone venturi 147 through solenoid operated valve 148. Solenoid operated valve 148 is electrically coupled to control panel 150 (FIG. 5D). Line 151 between ozone generator 152 and the ozone inlet of ozone venturi 147 is comprised of ⅜ inch OD teflon tubing. A tee 162 is inserted in the teflon tubing between the outlet of ozone generator 152 and solenoid operated valve 148. One leg of tee 162 is coupled to a vent line 149. Manually operated valve 171 and a 0-105 standard cubic feet per hour (SCFH) flow meter 165 are connected in series in vent line 149. The inlet of ozone generator 152 is connected to an oxygen supply 156 through pressure regulating valve 154 and through manually operated valve 155.

A third leg of tee 146 with a 2 inch ID is connected to a first leg of tee 157 and a second leg of tee 157 is connected to the inlet of flow meter 159. FIG. 4 is only illustrative of the components and the interconnections in purification unit 100 and is not indicative of the relative positions of the components. For example, FIG. 4 shows tee 146 having a 2 inch ID leg perpendicular to a 1 inch ID leg and a 2 inch ID leg. Hence, in this configuration there is potentially a sharp transistion from a 2 inch ID to a 1 inch ID. Such a transistion results in stagnant flow areas which are difficult to effectively sterilize. As previously described, in a preferred embodiment, the transistion within a tee or a coupler is smooth so that stagnant flow areas are minimized. Therefore, tee 146 would be positioned and selected so that the one inch leg is perpendicular to the two inch legs. The third leg of tee 157 is connected to a ¼ inch sample line which in turn is connected to a manually operated valve 158. The outlet of flow meter 159 is connected to tee 105, as previously described.

The lines, valves and tees, described above, are made of PVDF unless they have been specifically described as being made of another material. The elements are joined by socket fusion using methods known to those skilled in the art. Alternatively, the elements could be assembled using clamps or other suitable means for securing the elements together. A parts list for one embodiment of point of use deionized water purification unit 100 is given in Table II.

TABLE II

FIG.4

| Item No. | Description | Vendor |
|---|---|---|
| 92 | PVC/PVDF Manual Valve | GF Plastic Systems, Inc. |
| 93 | PVC/PVDF Pressure Regulating Valve | GF Plastic Systems, Inc. Ryan Herco |
| 94 | PVC/PVDF Check Valve | Ryan Herco |
| 164 | Low Pressure Cutout Switch | Filter Chem Model FC-VS-125 DC |
| 111 B/C, 107 B/C | Gauge Guard PVDF | Ryan Herco Model No. 5342-020 |
| 108 | PVDF Pump | Ryan Herco Model 6306-715 |
| 114 | UV Sterilizer | Aquafine Model CSL8R |
| 119 | Filter Housing SS-316 | Pall Model ENC1L05-4G33H using 5 each 40" cartridges Model No. AB4V0015-8E |
| 120 | 2" PVDF Diaphragm Valve | Ryan Herco Model 5755-020 |
| 135, 136 | 1¼" PVDF Diaphragm Valve | Ryan Herco Model 5755-015 |
| 138A, 138B | Fiberglass Polishers (no resin) | Park International (PI) |
| | Top | PI Model No. SF 20-6-45 |
| | Filter Base | PI Model No. SFA-AN-20 |
| | Assy. | PI Model No. XTA-6020 |
| | RTA Adapter | PI Model No. TA 4525-DDS4 |
| | RTA | PI Model No. OR 45 |
| | Distributors | PI Model No. X-HL 20-SM2 |
| 138A, 138B | Polisher Resins | Rhom & Haas |
| | Cation 2 cu ft | Ambersep ® 200 H |
| | Anion 5 cu ft | Ambersep ® 900 (OH) |
| 133, 142 | Resistivity Probs .01 T constant | Foxboro 920 M |
| 168 | PVDF Check Valve 2" | GF Plastic Systems, Inc. |
| 144 | Pressure Regulating Valve 1¼" Teflon Construction | Ryan Herco Model G 5422-015 |
| 147 | Ozone Contactor | Kynar 1" Venturi |
| 152 | Ozone Generator | Ozonair International Model #RX-5 |
| 159 | Polysulfone flow indicator 2", SS-316 float with polysulfone end connections | Ryan Herco Vertical-Port Flow meter Model No. 5805-349 |
| 148 | SS-316 Solenoid Valve 120V with teflon disc | ASCO Model 8263A303 |
| | All other piping and fitting | GF Plastic Systems, Inc. |

The piping sizes are not central to the invention, but the piping sizes were selected so that the pressure drop caused by flow through the pipes is not significant. Pump 108, and the pipe size are selected so that the water pressure in line 205 is at least 25 psig. Thus, if polishers 138A, 138B are placed between filter 119 and apparatus 200, pump 108 and the pipe size must be selected so that the pump discharge pressure minus the pressure drops caused by the piping, UV unit 114, filter 119 and polishers 138A, 138B is greater than 25 psig.

Valves 120, 136 are air operated diaphragm valves which are normally closed. Valve 135 is an air operated diaphragm valve that is normally open.

As previously described, UV unit 114 is used to reduce the TOC level in the deionized water from distribution line 90. In this embodiment, the 185 nanometer wavelength ultraviolet light is absorbed by the organic carbon contaminants in the water. The contaminants then decompose into substances that are removed by filter 119 and/or polishers 138A and 138B. Other wavelengths of ultraviolet light may be used in this invention. The ultraviolet wavelength is selected so that the ultraviolet light is absorbed by contaminants in the water which in turn decompose into materials which are removed by other components in purification unit 100.

Polishers 138A and 138B are parallel mixed bed polishers containing 60–70% anion resins and 30–40% cation resins. Typically, in prior art systems, polishers have had 60% anion resins and 40% cation resins. The percentage of each resin was selected based upon the anticipated fraction of anion and cation contaminants in the water.

In a preferred embodiment of this invention, the parallel mixed bed polisher resins are 70% anion resins and 30% cation resins. The 70/30 mixture was selected rather than the typical prior art mixture because as ultraviolet lamp unit 114 destroys organic carbon contaminants in the water, the organic contaminants usually decompose into ionic contaminants such as acetic acid and carbon dioxide. When the additional ionic impurities created by the use of ultraviolet lamp unit 114 are considered, the 70/30 mixture of resins provides a better approximation of the ratio of the cation and anion contaminants in the point of use purification system 100 of this invention than the prior art mixture.

Using prior art polishers in the present invention would require a large number of polishers to handle the 75 gpm flow in purification unit 100 because each prior art polisher can only withstand a flow of 10–12 gpm per square foot. Hence, using prior art polishers, the 75 gpm flow would require approximately 6 polishers. This large number of polishers would require considerable space because each prior art polisher is about 3.5 cubic feet in size. Since unit 100 is designed for use adjacent to apparatus 200, the space required by the large number of prior art polishers is generally not available.

Hence, polishers 138A, 138B of this invention contain synthetic resins which operate at much higher flow rates than the resins in conventional polishers. Resins suitable for use in polishers 138A, 138B are sold by Rohm and Haas Company of Philadelphia, Pa. under the trademark Ambersep ®. The characteristics of the Rohm and Haas Ambersep ® anion resin and the Ambersep ® cation resin are listed in Table III.

TABLE III

| | Macroreticular Ambersep ® |
|---|---|
| OH− Form Strong Base Anion | 900 (OH) |
| % Perfect Bead, min. | 95 |
| % Whole Bead, min. | 98 |
| % Fragments, max. | 2 |
| Chatillon (OH− avg. gm/bead), min. | 350 |
| % ≧ 200 gm/bead | 95 |
| % Moisture Holding Capacity | 60–70 |
| Capacity (meq/ml), min. | 0.95 |
| Screen Size % max. | |
| +16 | 5 |
| +20 | 20 |
| −45 | 1 |
| Effective Size, mm | 0.50 ± .08 |
| Uniformity Coefficient, max. | 1.4 |
| % Regeneration, OH−, min. | 93 |
| % $CO_3$, max. | 7 |
| % Cl Equiv., max. | 0.5 |
| % $SO_4$, max. | 0.1 |

| | Macroreticular Ambersep ® |
|---|---|
| H+ Form Strong Acid Cation | 200H |
| % Perfect Bead, min. | 99 |
| % Whole Bead, min. | 99 |

TABLE III-continued

| | |
|---|---|
| % Fragments, max. | 1 |
| Chatillon (H+, avg. gm/bead), min. | 350 |
| % ≧ 200 gm/bead | 95 |
| % Moisture Holding Capacity | 50-55 |
| Capacity (meq/ml), min. | 1.65 |
| Screen Size % max. | |
| +16 | 5 |
| −30 | 1 |
| −35 | — |
| −45 | — |
| Effective Size, mm | .72 ± .08 |
| Uniformity Coefficient, max. | 1.4 |
| % Regeneration, H+, min. | 99 |
| ppm Na+, dry wt. basis, max. | 200 |

The criteria used for selecting the resins in polishers 138A, 138B were: (1) the resin tolerates high flow rates without disintegrating and producing additional contaminants in the water; (2) the resin effectively removes ionic contaminants so as to provide 18 megaohm-cm water at the outlet; and (3) the resin resists organic fouling.

Ozone generator 152 (FIG. 4) is a solid state high frequency generator which uses clean dry air or pure oxygen to generate ozone having a concentration of from 2% to about 4%. The oxygen supplied to the ozone generator 152 should have a dew point of minus 60° F. Generator 152 provides from 10 to 25 SCFH of ozone at a pressure of 20 psig to venturi 147. As is described more completely below, the operation of the ozone generator is controlled by main control panel 150 (FIGS. 5A, 5D) and may be utilized as needed to destroy bacteria contamination in purification system 100.

One generator suitable for use in purification unit 100 is manufactured by Ozonair International Corporation of San Francisco, Calif. and sold as Model RX-5. This high frequency ozone generator has the following characteristics:

Ozone production from dry air: 14–16 gr/hr at up to 2% by weight (0.75 lbs/day)
Power: 110/120 VAC. 60 Hz, 150 Watts/hr
Current: 2 Amp.
Cooling system: One fan
Air flow metering: 0–50 SCFH adjustable
Feed gas input - Dry air: 20 SCFH @ 20 PSI
Air line: ⅜" OD Polyflo tubing
Ozone line: ¼" OD Teflon tubing
Controls: On/Off Switch. Run light. Fault light.

Ozone generator 152 is very sensitive to any moisture which may migrate from the flow through ozone venturi 147 and through line 151 into generator 152. To eliminate such moisture migration solenoid operated valve 148 is closed, except for periods when ozone generator 152 is operating. When solenoid operated valve 148 is closed, oxygen flows through valves 155 and 154 to ozone generator 152 through generator 152 to line 151 and out vent line 149. The flow through vent line 149 is controlled using valve 171 and flow meter 165. Thus, a positive flow is always maintained through generator 152 and generator 152 is isolated by valve 148 from the water flowing through venturi 147. When solenoid operated valve 148 is opened, ozone is being generated by generator 152, a small amount of ozone will be vented through line 149, if valve 171 is open. However, the ozone lost through line 149 does not significantly increase the time required for sterilization of system 100 and the amount is not sufficient to cause adverse effects in vent line 149.

Flow meter 159 is a vertical tube made of polysulfone which is ozone resistant. Flow meter 159 has a measurable flow range of 0 to 100 gpm.

Figure 5E:
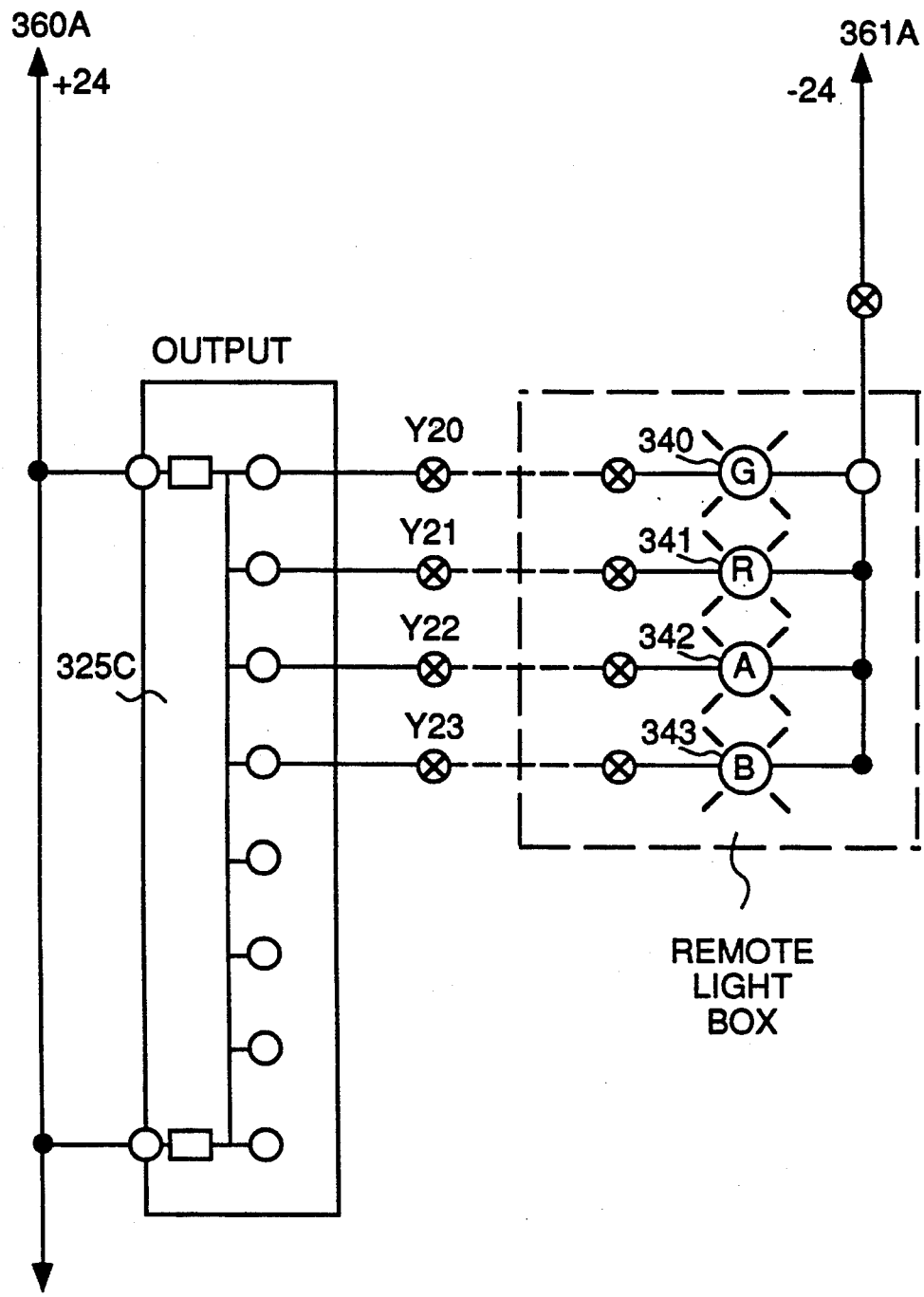
Figure 5F:
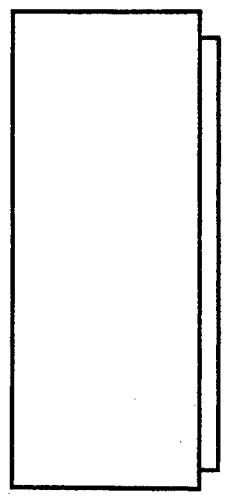
Figure 5G:
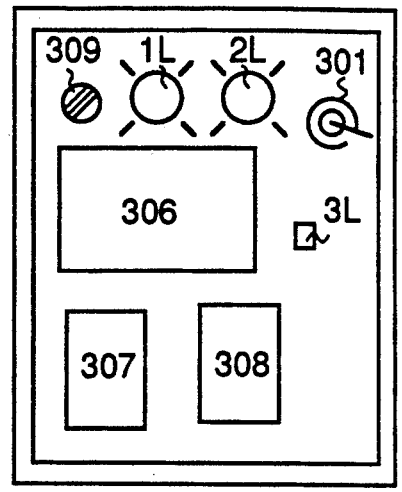
Figure 5I:
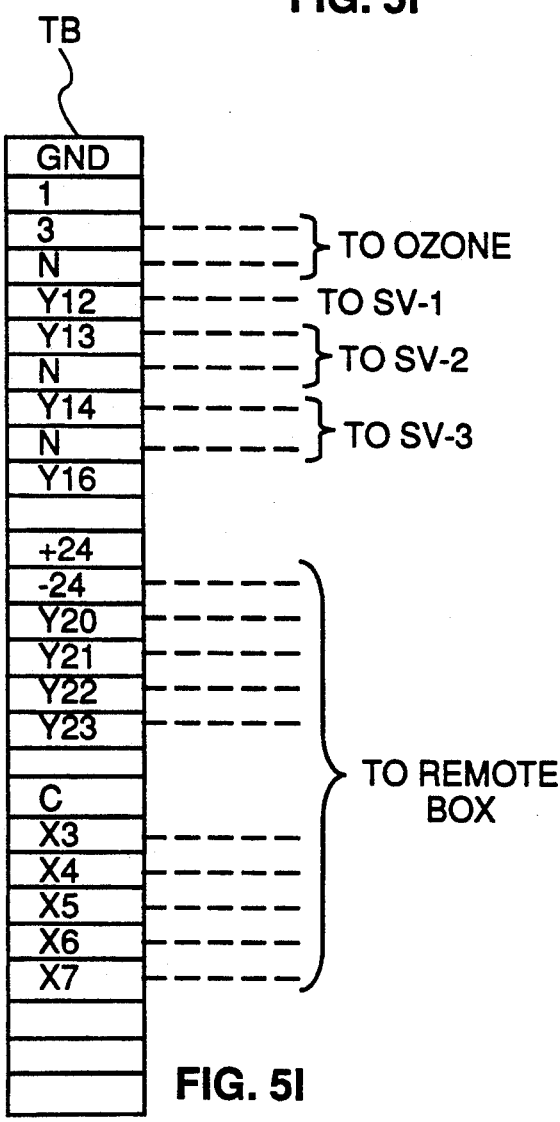

FIGS. 5A-5I illustrate one embodiment of the control panel 150 of this invention. As shown in FIG. 5G the front enclosure of control panel 150 has a hand-off-auto pump switch 309, a first light 1L, which indicates that pump 108 is running, a second light 2L, which is an alarm light that is energized when either pump 108 is inoperative or the resistivity falls below a selected value, a third light 3L, which indicates the status of the DC power supply, a main circuit breaker 301, a quality monitor 306, which provides a visual readout of water resistivity measured by probes 133, 142 (FIG. 4), a recorder 308, which provides a permanent record of the resistivity measurement from probes 133, 142 and a four position switch 307 which is used to select the signal from resistivity probes 133, 142 that is applied to recorder 308 and monitor 306.

Figure 5H:
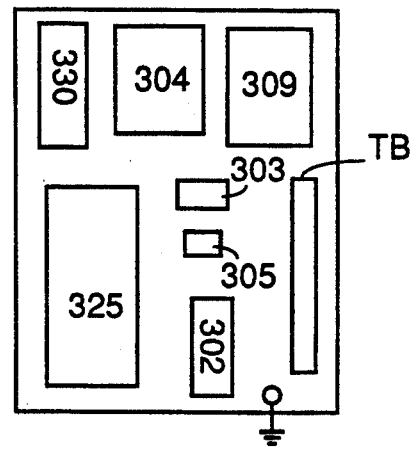

The rear of control panel 150, as shown in FIG. 5H, has a DC power supply 330, a transformer 304, main circuit breaker 309, a solid state programmable controller 325, ozone controller 305, 120 volt AC circuit breaker 303, motor controller 302 and a tie bar TB.

The interconnections of the components in control panel 150 are shown in FIGS. 5A-5E. A three-phase 230 volt, 60 Hz power input is applied to main circuit breaker 301 (FIG. 5A) and subsequently through motor controllers 302A, 302B, 302C to the 2 horsepower motor in pump 108A. Transformer 304 is tied to the main circuit breaker and provides 115 volts AC across lines 350, 351. Ten amp circuit breaker 303 is connected in series in line 350.

One power supply line 376 of ozone generator 152 is connected to line 351. The other power supply line 377 of ozone generator 152 is coupled to line 350 by ozone controller 305A and hand-off-auto switch 375. Specifically, ozone controller 305A is connected to line 350 and to pole $375_2$ of hand-off-auto switch 375. Terminals $375_3$, $375_4$ of switch 375 are connected to line 377 and terminal $375_1$ is connected to line 350. Similarly, UV lamp unit is connected to line 350 through switch 378 and to line 351.

Quality monitor 306 is connected in parallel with ozone generator 152 and controller 305A (FIGS. 5A) across lines 350, 351 (FIG. 5A). In one embodiment, quality monitor 306 is a meter sold by the Foxboro Company under Model No. 920M. Quality monitor 306 is connected to terminals C and X2 (FIG. 5C) on input bus 325A of solid state programmable controller 325. Quality monitor 306 (FIGS. 5A and 5B) is also connected to position cell switch 307 by four wire line 321. In one embodiment, cell switch 307 is a Foxboro four position switch. Switch 307 (FIGS. 5A and 5B) is connected to resistivity probe 133 and to resistivity probe 142 (FIG. 4). Positions 3 and 4 of cell switch 307 are not used in this embodiment. Monitor 306 (FIG. 5A) is also connected by a two wire line 320 to recorder 308 (FIG. 5B). In one embodiment, recorder 508 is manufactured by Rustrak and sold as Model No. 288.

In another embodiment, two additional resistivity probes (not shown) are added to unit 100 (FIG. 4). In this embodiment, resistivity probes 133, 142 are retained as the first and second probes connected to switch 307 (FIGS. 5A and 5B). A third resistivity probe (not shown) is inserted in purified water supply line 91 (FIG. 4) and a fourth resistivity probe (not shown) is inserted in line 118 prior to the inlet of filter unit 119. The third and fourth resistivity probes are connected to positions 3 and 4 respectively of switch 307.

Recorder 308 is connected across lines 350, 351 in parallel with quality monitor 306.

A first terminal $309_1$ of hand-off-auto switch 309 is connected to line 350, a second terminal $309_2$ is connected to output terminal Y10 on output bus 325B of solid state system controller 325 (FIG. 5D), a third and fourth terminal $309_3$, $309_4$ (FIG. 5B) are connected together and subsequently to overload protection relay 310. Overload protection relay 310 is also connected to line 351 through green light 1L and motor controllers 302. Light 1L is connected in parallel with motor controllers 302.

As shown in FIG. 5C, the solid state programmable controller 325 is powered by lines 350, 351 and has an input bus 325A with terminals C and X0–X7. In one embodiment, solid state programmable controller 325 is a General Electric Series I programmable controller, sold under Model No. IC610CPU101 Rev E. Automatic motor controller 327 is hooked across terminal C and X0. Controller 327 provides an indication of when motor 108A is operating. Low pressure suction switch 164 is connected across terminal C and X1. As previously described, quality monitor 306 is connected across terminals C and X2. Switch 326A is connected to terminal C and terminal X3, switch 326B to terminals C and X4, switch 326C to terminals C and X5, and switch 326D to terminals C and X6. Switches 326A–326D are physically located in a remote box at the location of apparatus 200 (FIG. 4). A push-button switch 328 is connected between terminal X7 and power supply line 350. Switch 328 is also in the remote box. The function of switches 326A–326C and switch 328 are described below. In one embodiment, switch 326D is configured as an off-on switch for pump 108.

As shown in FIG. 5D, the power supply line 350 is connected to output bus 325B of solid state programmable controller 325 and the power is selectively applied, under the control of the controller 325, to output terminals Y10–Y15.

Ozone relay 305B (FIG. 5D), which energizes ozone controller 305A and valve 148 (FIG. 4), is connected between terminal Y11 (FIG. 5D) of bus 325B and power supply line 351, the windings for solenoid valve SV1 between terminal Y12 and power supply line 351, the windings of solenoid valve SV2 between terminal Y13 and power supply line 351, solenoid valve SV3 between terminal Y14 and the power supply line 351, and finally red alarm light 2L is connected between terminal Y15 and power supply line 351. DC power supply 330 is connected across lines 350 and 351 and provides ±24 volts on lines 360–361 respectively to output terminal bus 325C (FIG. 5E) of solid state programmable controller 325. Controller 325 selectively applies +24 volts to terminals Y20–Y23 on bus 325C (FIG. 5E). Terminals Y20–Y23 are connected to lamps 340–344 respectively in a remote light box which is located at apparatus 200 (FIG. 4).

System controller 325 can be programmed so that pump 108, ozone generator 152 and solenoid valves SV1, SV2, SV3 are automatically energized/de-energized. The operation of purification unit 100 is dependent upon the water quality available from distribution pipe 90 of the plant purification system (FIG. 1), as well as the quality (purity) of water required by point of use apparatus 200. Hence, as described more completely below, unit 100 is first operated in a manual or semiautomatic mode until experiments, described below, have been performed to define the period of normal operation in hours, the period of sterilization in minutes, and the frequency of sterilization. After the necessary timing sequences are experimentally established system controller 325 is programmed, using techniques known to those skilled-in-the-art, to automatically operate for the established time period in each mode of operation.

To operate point of use deionized water purification unit 100, the purification unit 100 is first attached to distribution line 90 and to the apparatus 200, as previously described. The unit is then cleaned of any residual contamination.

In the cleaning cycle quartz sleeves are placed in UV unit 114 (FIG. 4) and the filters are not placed in filter unit 119. Vent valve 124 on filter unit 119 is opened and valve 92 is opened so that water flows into purification unit 100. Water continues to flow into unit 100 until the unit is filled and all trapped air is forced out vent valve 124. Subsequently, valve 124 and valve 92 are closed and pump 108 is manually started and briefly ran. Pump 108 is stopped and one-half cup of non-ionic soap which contains no phosphorus is added to purification unit 100 by removing a cap of filter unit 119 and pouring the soap into filter unit 119.

After insertion of the soap and replacement of the cap on filter unit 119, pump 108 is activated and ran for two hours. After this time, unit 100 is drained through valve 210 and then refilled and flushed with water from distribution line 90. After flushing and refilling unit 100, oxygen from line 156 is flowed through unit 152 for 24 hours at 10SCFH. The oxygen ensures that no moisture is left in unit 152.

After 24 hours of flowing oxygen, filter housing 119 is emptied through valve 125 and subsequently filled with 15% hydrogen peroxide solution. The hydrogen peroxide solution is recirculated through purification unit 100 for 24 hours and then purification unit 100 is again drained and flushed using water from distribution line 90. Unit 100 is again filled with clean DI water from distribution line 90 and the pump started and the water recirculated through unit 100. Unit 100 is placed in the sterilization mode, as described below, and ran for one hour. Valve 210 is then opened and the ozonated water flows continuously through apparatus 200. Note, when valve 210 is opened, valve 92 must also be opened so that make-up water is taken from distribution line 90. After the one hour sterilization, the valves in the system are adjusted at the approximate flow settings for operation. Unit 100 is then again drained and the filter elements are placed in unit 119 and the system is refilled with the DI water from distribution line 90. All lines are vented in unit 100 through the appropriate vent valves or sample valves and then unit 100 is started and ran in the sterilization mode for one-half hour.

A cleaning process, such as that described above, is used each time purification unit 100 is interconnected with apparatus 200 and distribution line 90 so that any sources of contamination which may have been introduced into the system either during hook-up or prior to hook-up are removed from unit 100.

After purification unit 100 is cleaned and filled with water, pump 108 is turned on and manual throttle valve 109 is adjusted so that the flow through flow meter 159 reads 75 gpm. Valve 144 is adjusted so that pressure gauge 107 on suction line 104 of pump 108 is in the range of 10 to 15 psig.

The volume in the distribution loop, defined by the flow path from tee 105 through pump 108, UV lamp unit 114, filter 119, line 205, polishers 138A, 138B, valve 144, venturi 147, and flow meter 159 back to tee 105, is estimated at 10 gallons. The actual volume, of course, depends on the length of pipes 127, 161 required to connect units 101, 102 to apparatus 200 and the length of pipe 205 in apparatus 200. Assume that the total flow in the distribution loop is set at 75 gpm, as described above, and that upon each pass through the loop the TOC level is reduced by 5 ppb by UV lamp unit 114. Also, assume point of use apparatus 200 requires 15 gpm so that 15 gpm is being extracted from line 90 as makeup water and this makeup water has a TOC level of 50 ppb.

With a 75 gpm flow, the 10 gallons in the loop pass around the loop 7.5 times in one minute. On each pass through the loop, the TOC level is reduced by 5 ppb by UV lamp unit 114 so that after 7.5 passes the total reduction in TOC level is 37.5 ppb (7.5×5 ppb). Since water from line 90 initially has 50 ppb, after one minute the residual TOC level in the ten gallons is 12.5 ppb (50 ppb–37.5 ppb).

However, 15 gpm is being withdrawn from the loop. Therefore, 15 gpm of the water has a TOC level of 50 ppb and 60 gpm of the water (75 gpm–15 gpm) has a TOC level of 12.5 ppb. The estimated TOC level at the point of use is Estimated $TOC$ Level =

$$\frac{(15 \text{ gpm}) \times (50 \text{ ppb}) + (60 \text{ gpm}) \times (12.5 \text{ ppb})}{75 \text{ gpm}}$$

Estimated $TOC$ Level = 20 ppb

Thus, the 50 ppb TOC level from line 90 is reduced by purification unit 100 to a level of 20 ppb, a 60% reduction. The reduction in TOC level will be even greater if either the usage by apparatus 200 is less than 15 gpm or the usage by apparatus 200 is intermittent so that the water recirculates through unit 100 for more than one minute. This example is illustrative only and is not intended to limit the scope of the invention to the levels of reduction given.

In actual operation, the flow in unit 100 will be experimentally determined. For the most economical operation of unit 100, pump 108 is operated at the lowest flow which provides the desired water quality to apparatus 200. The flow is adjusted based upon the quality of water in DI distribution line 90, the amount and frequency of makeup water required from distribution line 90 and the purity of water required by apparatus 200. Initially, the flow is set at 75 gpm, as described above, and the water quality monitored at apparatus 200. The flow is reduced to 70 gpm, for example, and the water quality is again monitored at apparatus 200. In this manner, an economical flow is experimentally established which provides the required water purity to apparatus 200.

The operation of pump 108 and air operated valves 120, 135, and 136 is controlled through control panel 150. The factor that is critical to the invention is when valves 120, 135, and 136 are opened and closed. Various combinations of solenoid valves SV1 to SV3 and valves 120, 135, 136 may be used to achieve the desired function. Accordingly, the embodiment described herein is illustrative only and is not intended to limit the scope of the invention.

As previously described, in normal operation, main circuit breaker 301 and 10 amp circuit breaker 303 (FIG. 5A) are energized so that power is available to pump 108 and to the various components, as previously described, connected across 110 volt power supply lines 350, 351. The operation of pump 108 is controlled by programmable system controller 325 and switch 309. If switch 309 connects the first and third terminals $309_1$, $309_3$ of switch 309, then power is supplied through overload relay 310 directly to the controllers 302A, 302B, 302C so that the pump 108 operates and light 1L is green indicating that the pump is on. This is the "manual-on" position of switch 309.

In the automatic mode, however, the switch 309 is set so that the second and fourth contacts $309_2$, $309_4$ are connected. Programmable system controller 325 automatically controls operation of pump 108 by selectively applying power to output terminal Y10, which in turn passes the power through switch 309 and energizes motor controller 302A–302C (FIG. 5A). When motor controller 302A–302C are energized, controller 327 (FIG. 5C) is also energized. In response to the signal from controller 327 system controller 325 removes the pump inoperative signal to alarm light 2L (FIG. 5D) and to blue alarm light 343 (FIG. 5E) on the remote light box. In the automatic mode, the user can program system controller 325, using methods known to those skilled in the art, so that pump 108a automatically starts and stops at selected intervals.

Operation of pump 108 assumes that low pressure suction switch 164 is closed and provides an appropriate signal on terminal X1 of controller 325. During normal operation controller 325 generates a signal on terminal Y20 on bus 325C so that the green light 340 on the remote light box is lit.

Controller 325 also generates signals on terminals Y12–Y14 on bus 325B (FIG. 5D) so that solenoid valves SV1–SV3 respectively are energized so that valve 120 (FIG. 4) is closed, valve 136 is closed and valve 135 is opened. In this configuration, the water in the distribution loop flows through the UV unit 114 and polishers 138 and 138b since the bypass paths are isolated by valves 120, 136. During normal operation of unit 100, the signal provided by the quality monitor on terminal X2 of bus 325A (FIG. 5C) is used to monitor the resistivity of the water in unit 100. Again, using techniques known to those skilled in the art, controller 325 is programmed so that when the resistivity falls below a desired level, 17–18 Megaohm-cm in one embodiment, as indicated by the signal from quality monitor 306, the controller provides a signal on output terminal Y15 which energizes alarm light 2L (FIG. 5D) and on output terminal X23 which energizes blue alarm light 343 (FIG. 5E) on the remote light box. Finally, during normal operation the signal on output terminal Y11 is such that ozone relay 305B is not energized and so valve 148 (FIG. 4) is closed and ozone generator 152 is not energized.

After purification unit 100 has been operated for some period of time, the exact period depending upon the quality of water from distribution line 90, bacterial contamination will multiply to an extent that the bacterial contamination may affect semiconductor processing using apparatus 200. Therefore, at this time, apparatus 200 is stopped from processing semiconductor wafers. Control panel 150 is used to initiate a sterilization cycle.

The operation of control panel 150 for the sterilization mode may be either manual or automatic. Initially, the sterilization operation of unit 101 will be performed manually and a series of measurements make to determine the required interval between sterilization cycles and the appropriate length of the sterilization cycles, as described more completely below. After the experimental determination of the sterilization sequence timing, system controller 325 is programmed to automatically perform the sterilization cycle.

Initially, controller 325 is programmed so that after a selected period of time, usually four hours, after switch 326A (FIG. 5C) is closed the signal on terminal Y20 goes off, and the signal on Y22 goes on so that the green light 340 on the remote light box goes off and the amber light 342 goes on. The amber light indicates that the purification unit 100 needs to be sterilized. To initiate the sterilization cycle the operator closes switch 326B on the remote box. When switch 326B (FIG. 5C) is closed, controller 325 prepares unit 100 for the sterilization cycle. The controller energizes solenoid valve SV2 so that air operated valve 135 (FIG. 4) closes and controller 325 provides a signal on terminals Y12 and Y14 (FIG. 5D) so that solenoid valves SV1 and SV3 cause air operated valves 120 and 136 (FIG. 4) to open.

Accordingly, the flow through the distribution loop as, previously defined, is altered because the polishers 138A, 138B are bypassed and physically isolated from the flow loop by closed valve 135 and check valve 168 and flow through UV unit 114 is partially bypassed by open valve 120.

When the operator is ready to start the sterilization cycle switch 326C (FIG. 5C) on the remote box is closed. When switch 326C is closed after switch 326B has been closed, the controller applies an output signal on terminal Y11 which energizes ozone relay 305B. Alternatively, if switch 326C is closed and switch 326B has not been closed, valve 210 (FIG. 4) is opened so that water from unit 100 is used by apparatus 200.

When ozone controller 305A (FIG. 5A) is energized by closing switches 326B and 326C (FIG. 5C) in sequence, valve 148 (FIG. 4) is opened and power is applied to ozone generator 152 (FIG. 5A) when hand-off-auto switch 375 is in the auto mode so that a connection is made between contacts $375_2$, $375_4$. Accordingly, ozone is applied to contactor 147 (FIG. 4). During the transistion from normal operation to the sterilization mode, controller 325 can be programmed to turn off pump 108, assuming the switch 309 (FIG. 5B) is in the automatic position. In this case, upon initiation the sterilization cycle, i.e., the closing of switch 326C, controller 325 would restart pump 108 by applying a signal to terminal Y10. During the sterilization cycle the controller provides a signal on terminal Y21 so that the red light on the remote light box is lit.

With flow established through the loop by pump 108 (FIG. 4) and the valves configured as described above, ozone generator 152 energized by control panel 150 and solenoid valve 148 opened, ozone flows from generator 152 through line 151 and solenoid valve 148 into ozone venturi 147. As previously described, the water pressure is regulated by valves 144, 93 so that the pressure in the distribution loop is dropped from the 17–32 psig to approximately about 10–15 psig. This pressure drop assures that a pressure differential of greater than 20 psig is maintained between the water pressure in venturi 147 and the ozone pressure. Therefore, ozone can be successfully injected into the water through venturi 147. Specifically, as the water flows through a restricted opening in venturi 147 a relative state of vacuum is created so that the ozone easily passes through the venturi into the water and mixes with the water. Typically, the flow of water across the venturi ranges from 10 gpm to 15 gpm.

The ozonated water flows throughout unit 100 except no flow is established through polishers 138A, 138B which have been isolated from the distribution loop, as previously described. Valve 120 is adjusted so that some ozonated water partially bypasses ultraviolet lamp unit 114 because ultraviolet lamp unit 114 effectively removes ozone from the water. Thus, valve 120 is a means for partially bypassing unit 114. The ozonated water bypassing unit 114 through valve 120 is such that the residual ozonated water in the distribution loop has a concentration of up to 1 ppm of ozone. The ozonated water contacts all the wetted surface, including use points and consequently all the wetted surfaces are sterilized.

The sterilization cycle continues for a selected period of time and then system controller 325 first de-energizes ozone relay 305B by changing the signal on output terminal Y11 so that ozone generator 152 is de-energized and then reverses the signals on Y12, Y13, and Y14 so that solenoid valves SV1-SV3 are in the operational mode and the status light on the remote box returns to green. Alternatively, the operator can allow the sterilization cycle to continue for a selected period and then reinitialize unit 100 by manually closing switch 326A (FIG. 5C). Note that push-button switch 328 on the remote box can be sequentially operated by the operator to step the controller 325 through the various steps in sterilization mode and normal operation mode.

As described above, the sterilization frequency and duration for purification unit 100 can be automatically controlled by system controller 325 in control panel 150 or manually controlled by an operator. Irrespective of the means of control, the frequency of sterilization will be experimentally determined in each use of purification unit 100. Initially, a selected period of between one and four hours is established for sterilization and bacteria counts taken at point of use 202 at selected time intervals. The time interval for sterilization is adjusted so that the bacteria level remains below the desired standard at all times. After the sterilization period is initially determined, the sample period is lengthened from daily counts to weekly measurements and then to monthly measurements so that at a maximum, operation is monitored for a two to three month period. At the end of the trial period, the frequency of sterilization and the length of the sterilization cycle assures that the bacterial count is always within an acceptable range.

Automatic sterilization, is a unique feature of this invention. As described previously for prior art systems, sterilization required closing down the entire system and then cycling the system for an extended period of time. In the prior art system (FIG. 1), a storage tank, which typically contains at least hundreds of gallons and in fact generally contains thousands of gallons of water, was sterilized. In the present invention only the surfaces which contain a total volume of about 10 gallons, as described above, must be sterilized and a means is provided for doing this at a predetermined frequency and duration. Ideally, the sterilization cycle will be synchronized with the operation of apparatus 200 so that during periods of 1–4 hours apparatus 200 is sterilized within 5–10 minutes. In this mode of operation, the sterilization cycle of purification unit 100 is transparent to users of apparatus 200 and alarms are provided to warn the user of the sterilization.

The embodiments of this invention described above are illustrative only and are not intended to limit the scope of this invention. According to the principles of this invention, other embodiments will be apparent to those skilled in the art.

I claim:

1. A point of sue water purification apparatus for insertion in a purified water supply line at the location of another apparatus requiring high purity water, the water supply line normally supplying such another apparatus with deionized purified water, said deionized purified water having impurities such as bacteria, particulates, organic carbon contaminants, and a resistivity of about 17–18 megohm-cm, said point of use water purification apparatus comprising:

means, operatively connectable to such a water supply line, for generating a flow of water having an approximately constant pressure, the flow generating means having an inlet and an outlet wherein the inlet receives water from such a water supply line and the approximately constant water pressure is generated at the outlet;

means, operatively connected to said generating means, for reducing organic carbon contaminants and having an inlet and an outlet wherein water received at the inlet of the organic carbon contaminant reducing means from said generating means has a first level of organic carbon contaminants and water at the outlet of the organic contaminant reducing means has a second level of organic carbon contaminants, the second organic carbon contaminants level being less than the first organic carbon contaminants level;

means, operatively connected to the organic carbon contaminant reducing means, for filtering water and having an inlet and an outlet wherein water from said organic carbon contaminant reducing means, received by the inlet of said filtering means, has a first level of particulates and water at the outlet of said filtering means has a second level of particulates which is lower than said first level;

coupling means, operatively connected to said filtering means and operatively connectable to such another apparatus, for providing the water from the filter means to such another apparatus upon demand;

means, operatively coupled to the coupling means, for polishing water and having an inlet and an outlet wherein water from said coupling means is provided to the inlet of the polishing means and the polished water is provided at the outlet of the polishing means;

means, operatively connected to said polishing means, for sterilizing and having an inlet coupled to the outlet of said polishing means and an outlet, said outlet being coupled to the inlet of said generating means to form a recirculation path through said point of use water purification apparatus; and control means, operatively coupled to said organic carbon contaminant reducing means, to said polishing means and to said sterilization means, for selecting the mode of operation of said point of use water purification apparatus wherein in a first mode of operation, the point of use water purification apparatus provides high purity water to such another apparatus, and in a second mode of operation, said recirculation path through the point of use water purification apparatus is sterilized.

2. The point of use water purification apparatus of claim 1 wherein the generating means comprises a centrifugal booster pump.

3. The point of use water purification apparatus of claim 2 wherein the centrifugal booster pump provides a water pressure at the pump outlet of approximately about 17–32 psig at a flow of approximately 40–75 gpm.

4. The point of use water purification of claim 3 wherein the flow is approximately 75 gpm.

5. The point of use water purification apparatus of claim 4 wherein the centrifugal booster pump is constructed of polyvinylidene fluoride.

6. The point of use water purification apparatus of claim 1 wherein the means for reducing organic carbon contamination comprises an ultraviolet lamp unit.

7. The point of use water purification apparatus of claim 6 wherein the ultraviolet lamp unit generates radiation having about a 185 nanometer wavelength.

8. The point of use water purification apparatus of claim 6 wherein the ultraviolet lamp unit reduces the organic carbonic contaminants for flows through the lamp unit of about 40–100 gpm.

9. The point of use water purification apparatus of claim 1 wherein the means for filtering water comprises a filter housing containing about 0.2 micron filters.

10. The point of use water purification apparatus as in claim 9 wherein the filters are ozone resistant.

11. The point of use water purification apparatus of claim 1 wherein the means for polishing water comprises two polishers connected in parallel wherein each polisher contains resins such that said polishers are operative for flow through said polishers of approximately 25–35 gpm.

12. The point of use water purification apparatus as in claim 11 wherein each polisher is a mixed bed polisher.

13. The point of use water purification apparatus as in claim 12 wherein the bed of each polisher contains approximately about 60–70% anion resin and about 30–40% cation resin.

14. A point of use water purification apparatus as in claim 13 wherein the mixed ion bed polisher contains about 70% anion resins and about 30% cation resins.

15. The point of use water purification apparatus as in claim 1 wherein the sterilizing means further comprises:

means for regulating water pressure having an inlet and an outlet wherein the inlet of the water pressure regulating means comprises the inlet of the sterilizing means and the outlet of the water pressure regulating means comprise the outlet of the sterilizing means; and means, operatively connected in parallel with the water pressure regulating means, for induction of a sterilizing agent wherein the sterilizing agent is introduced into the means for induction at a first pressure and the means for regulating water pressure drops the water pressure in said water purification apparatus so that the water pressure in said induction means is less than the first pressure.

16. The point of use water purification apparatus as in claim 15 wherein the sterilizing agent comprises ozone.

17. The point of use water purification apparatus as in claim 16 wherein the sterilizing means further comprises:

controllable means, connectable to a source of oxygen and operatively coupled to the induction means, for generating ozone wherein the controllable ozone generating means changes oxygen from such a source of oxygen to ozone and provides the ozone to said induction means.

18. The point of use water purification apparatus as in claim 17 further comprising:

a first controllable valve coupled between the outlet of the second coupling means and the inlet of the polishing means;

a second controllable valve coupled between the outlet of said second coupling means and the inlet of the means for regulating water pressure; and a third controllable valve in parallel with the organic carbon contaminant reducing means wherein said control means is operatively connected to the first, second and third controllable valves and the means for generating ozone and in said first mode of operation of the point of use water purification apparatus, the control means closes the second and third controllable valves, opens the first controllable valve and disables the means for generating ozone, and in said second mode of operation, the control means closes the first controllable valve, opens the second and third controllable valves and enables the ozone generator.

19. A method for purifying water having about a 17–18 megohm-cm resistivity in a point of use water supply line comprising the steps of:

(a) removing organic contaminants from said water;

(b) filtering the water after removal of the organic contaminants; and (c) providing the filtered water to a point of use apparatus.

20. The method of claim 19 further comprising the step of:

recycling unused filtered water through steps (a)–(c).

21. The method of claim 19 further comprising the step of polishing the water after removal of organic contaminants.

* * * * *